United States Patent
Tsai et al.

(10) Patent No.: US 6,324,595 B1
(45) Date of Patent: Nov. 27, 2001

(54) DEDICATION OF SPACE IN DESCRIPTOR FOR MINIMIZING DATA PROCESSING DURING COMMUNICATIONS BETWEEN A PERIPHERAL DEVICE AND A HOST SYSTEM

(75) Inventors: Din-I Tsai, Fremont; Robert A. Williams, Cupertino, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/270,239

(22) Filed: Mar. 15, 1999

(51) Int. Cl.[7] .............................. G06F 3/00; G06F 3/02; G06F 3/023; G06F 12/00; G06F 12/14
(52) U.S. Cl. ................... 710/15; 710/5; 710/19; 710/52; 711/147
(58) Field of Search .............................. 710/4.5, 15, 52, 710/19; 709/224, 249; 711/156, 111, 118, 147

(56) References Cited

U.S. PATENT DOCUMENTS

| | | | |
|---|---|---|---|
| 5,771,349 | * 6/1998 | Picazo, Jr. et al. | 713/202 |
| 5,841,990 | * 11/1998 | Picazo, Jr. et al. | 709/249 |
| 6,006,275 | * 12/1999 | Picazo, Jr. et al. | 709/249 |
| 6,047,001 | * 4/2000 | Kuo et al. | 370/428 |
| 6,061,767 | * 5/2000 | Kuo et al. | 711/156 |
| 6,061,768 | * 5/2000 | Kuo et al. | 711/156 |
| 6,092,108 | * 7/2000 | DiPlacido et al. | 709/224 |
| 6,115,761 | * 9/2000 | Daniel et al. | 710/57 |
| 6,145,016 | * 11/2000 | Lai et al. | 710/4 |
| 6,182,164 | * 1/2001 | Williams | 710/15 |

* cited by examiner

Primary Examiner—Thomas Lee
Assistant Examiner—Chun Cao
(74) Attorney, Agent, or Firm—Monica H. Choi

(57) ABSTRACT

A data storage device has a control block at a first location for storing control data generated by a host system to provide control information to a peripheral device. This control block includes a first predetermined location for storing predetermined data that is generated by the host system. The data storage device also includes a status block at a second location for storing the status data generated by the peripheral device to provide status information to the host system. In addition, the status block includes a second predetermined location for storing the predetermined data. The first location of the control block and the second location of the status block are separate and independent. The peripheral device reads the predetermined data from the control block to write the predetermined data into the second predetermined location within the status block. The host system then reads the predetermined data from the second predetermined location of the status block.

16 Claims, 2 Drawing Sheets

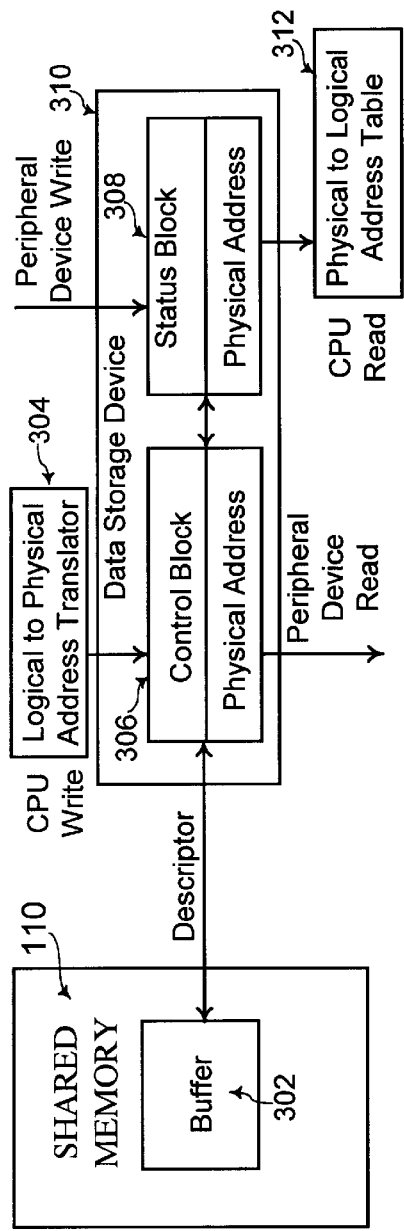
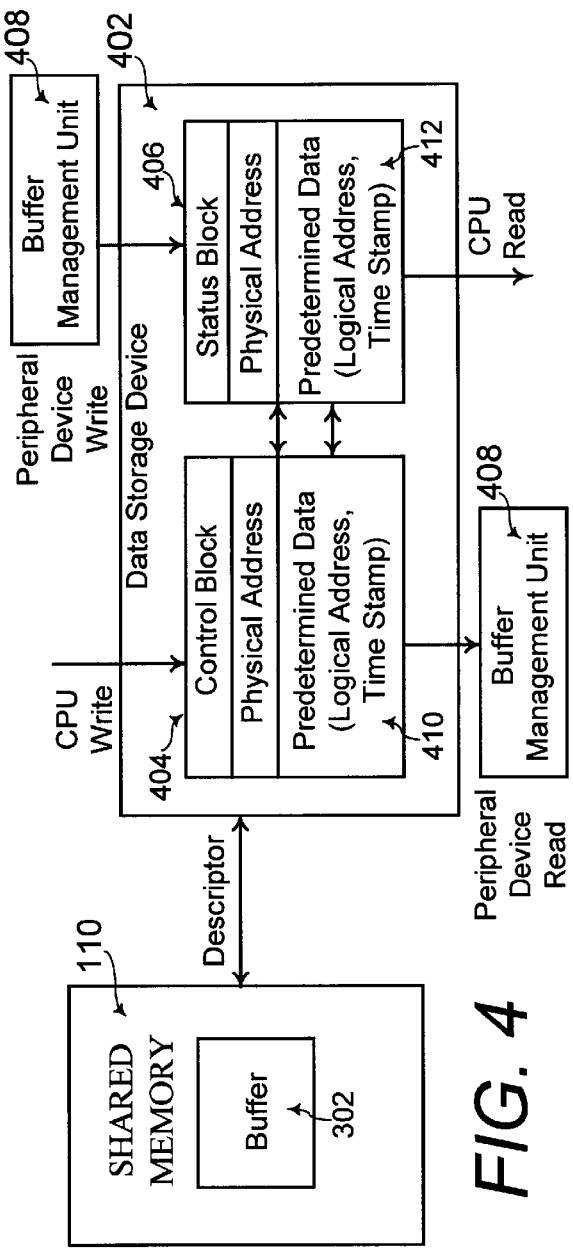

DEDICATION OF SPACE IN DESCRIPTOR FOR MINIMIZING DATA PROCESSING DURING COMMUNICATIONS BETWEEN A PERIPHERAL DEVICE AND A HOST SYSTEM

TECHNICAL FIELD

This invention relates to interaction between a peripheral device and a host system, and more particularly to a mechanism for exchanging control data between the peripheral device and the host system with a dedicated space in a descriptor for minimizing data processing during communications between the peripheral device and the host system.

BACKGROUND OF THE INVENTION

The present invention will be described with an example application for an Ethernet computer network peripheral device which couples a host computer system to a network of computers. In this example application, a CPU of the host computer system and the Ethernet computer network peripheral device share access to a shared memory within the host computer system. In particular, the present invention is described with respect to buffers that are shared for access between the CPU and the computer network peripheral device as described herein. However, from this example application, it should be appreciated by one of ordinary skill in the art of electronic systems that the present invention may be practiced for other computer peripheral devices that share access to any shared memory with the host computer system.

Referring to FIG. 1, a computer peripheral device 102 may be an Ethernet computer network peripheral device which allows a host computer 104 to communicate with other computers within a network of computers 106. Such a computer peripheral device 102 receives and transmits data packets on the network of computers 106. The computer peripheral device 102, which may be an Ethernet computer network peripheral device, receives and transmits data packets on the network of computers 106 in accordance with standard data communications protocols such as the IEEE 802.3 network standard or the DIX Ethernet standard as is commonly known to one of ordinary skill in the art of Ethernet computer network peripheral device design.

The host computer 104 may be a PC or any other type of computer, and has a host system which includes a CPU 108 and a shared memory 110 which may be any data storage device found in a PC or a workstation. The CPU 108 further processes a data packet received from the network of computers 106 or generates a data packet to be transmitted on the network of computers 106. The shared memory 110 is shared between the CPU 108 of the host system 104 and the computer network peripheral device 102. In a DMA (Direct Memory Access) mode of operation, the computer network peripheral device 102 has direct access to the shared memory 110 within the host system of the computer 104.

When the computer network peripheral device 102 receives a data packet from the network of computers 106, that data packet is written into at least one buffer within the shared memory 110 directly by the computer network peripheral device 102 for further processing by the host system CPU 108. The CPU 108 also accesses those buffers within the shared memory 110 to further process the data packet stored within the shared memory 110.

Alternatively, the CPU 108 accesses at least one buffer within the shared memory 110 to write a data packet to be transmitted on the network of computers 106. The computer network peripheral device 102 then accesses those buffers within the shared memory 110 to read the stored data packet in order to transmit such a data packet over the network of computers 106.

Since both the CPU 108 and the computer network peripheral device 102 access the shared memory 110, such shared access to the shared memory 110 is coordinated between the CPU 108 and the computer network peripheral device 102 for harmonious interaction between the two devices. Thus, referring to FIG. 2, the CPU 108 of the host system 104 and the computer peripheral device 102 share a first buffer 212, a second buffer 214, and a third buffer 216 in the shared memory 110. A buffer may be used to store a data packet or a portion of a data packet received or to be transmitted over the network of computers 106.

Access to the shared memory 110 between the CPU 108 and the computer network peripheral device 102 is coordinated by the use of descriptors. Referring to FIG. 2, each buffer within the shared memory 110 has a respective descriptor. A first descriptor 222 corresponds to the first buffer 212, a second descriptor 224 corresponds to the second buffer 214, and a third descriptor 226 corresponds to the third buffer 216. Each descriptor has respective control data and respective status data corresponding to the respective buffer associated with that descriptor.

Thus, the first descriptor 222 has first control data 232 and first status data 242 corresponding to the first buffer 212. The second descriptor 224 has second control data 234 and second status data 244 corresponding to the second buffer 214. The third descriptor 226 has third control data 236 and third status data 246 corresponding to the third buffer 216.

The CPU 108 writes the control data corresponding to a descriptor to communicate control information to the peripheral device 102, including the state of processing by the CPU 108 data within the corresponding buffer. Thus, the peripheral device 102 reads the control data corresponding to a descriptor to determine the state of processing by the CPU 108 data within that corresponding buffer. On the other hand, the peripheral device 102 writes the status data corresponding to a descriptor to communicate status information to the CPU 108, including the state of processing by the peripheral device 102 data within the corresponding buffer. Thus, the CPU 108 reads the status data corresponding to a descriptor to determine the state of processing by the peripheral device 102 data within that corresponding buffer.

In the design of some computer peripheral devices, the control block and the status block, corresponding to a given buffer, are stored into separate independent locations in memory. A first location in memory of the control block cannot be determined from the second location in memory of the status block, and vice versa (i.e., the second location in memory of the status block cannot be determined from the first location in memory of the control block). An example of such a design is to minimize cache data processing overhead as described in a copending patent application with title "Minimizing Cache Overhead by Storing Data for Communications between a Peripheral Device and a Host System into Separate Locations in Memory," to Robert Williams having Ser. No. 09/204,978 and filing date of Dec. 3, 1998, and having common assignee herewith. This patent application is incorporated herein by reference.

When the control block and the status block, corresponding to a given buffer, are stored into separate independent locations in memory, the manner in which the CPU 108 writes control data and in which the computer peripheral device 102 writes the status data may affect the data processing overhead of the CPU 108 or the computer peripheral device 102.

SUMMARY OF THE INVENTION

Accordingly, the present invention is a mechanism for exchanging control data and status data between the computer peripheral device and the CPU of the host system while minimizing the data processing overhead of the CPU or the computer peripheral device.

In a general aspect, the present invention is an apparatus and method for exchanging control data and status data between a peripheral device and a computer host system with the control data and the status data comprising a descriptor corresponding to a buffer within a shared memory. The present invention includes a data storage device having a control block of the descriptor that corresponds to the buffer in the shared memory. This control block is located in a first location of the data storage device and stores the control data generated by the host system to provide control information to the peripheral device. This control block includes a first predetermined location for storing predetermined data. This predetermined data may be the logical address of the buffer in the shared memory. The data storage device also includes a status block of the descriptor for storing the status data generated by the peripheral device to provide status information to the host system. In addition, the status block is located in a second location of the data storage device and includes a second predetermined location for storing the predetermined data. The first location of the control block and the second location of the status block are in separate independent memory locations.

The present invention further includes a data processing unit of the host system, coupled to the data storage device, for writing the control data into the control block and for generating and writing the predetermined data into the first predetermined location within the control block. Furthermore, the present invention includes a buffer management unit of the peripheral device, coupled to the data storage device, for writing the status data into the status block, and for reading the predetermined data from the control block to write the predetermined data into the second predetermined location within the status block. The data processing unit of the host system then reads the predetermined data from the second predetermined location of the status block for processing data in the buffer that corresponds to the descriptor.

Generally, predetermined data that the data processing unit includes in the control block is read by the buffer management unit of the peripheral device and is then passed back to the data processing unit via the status block. For example, the logical address of the buffer is written into the control block by the CPU. The peripheral device reads the logical address from the control block and does not use such data for processing data packets. Rather, the logical address is written into the status block for latter use by the CPU. In this manner, the CPU has reduced data processing requirements when reading the status block since a physical to logical address table is no longer used.

Other examples of predetermined data include a time stamp of when the computer peripheral device writes the status data into the status block. Alternatively, the present invention may be practiced for the peripheral device writing predetermined data into a status block which the CPU does not use for processing data packets. In that case, the CPU reads such data from the status block and then writes such predetermined data into the control block for latter use by the peripheral device.

These and other features and advantages of the present invention will be better understood by considering the following detailed description of the invention which is presented with the attached drawings.

BRIEF DESCRIPTION OF THE DRAWINGS

FIG. 3 shows a mechanism for exchanging control data and status data for communications between the host system and the computer network peripheral device, which requires added data processing overhead for the CPU according to the prior art; and FIG. 4 shows a mechanism for exchanging control data and status data for communications between the host system and the computer network peripheral device, which minimizes data processing overhead for the CPU, according to the present invention.

The figures referred to herein are drawn for clarity of illustration and are not necessarily drawn to scale. Elements having the same reference number in FIGS. 1, 2, 3, and 4 refer to elements having similar structure and function.

DETAILED DESCRIPTION

Figure 1:
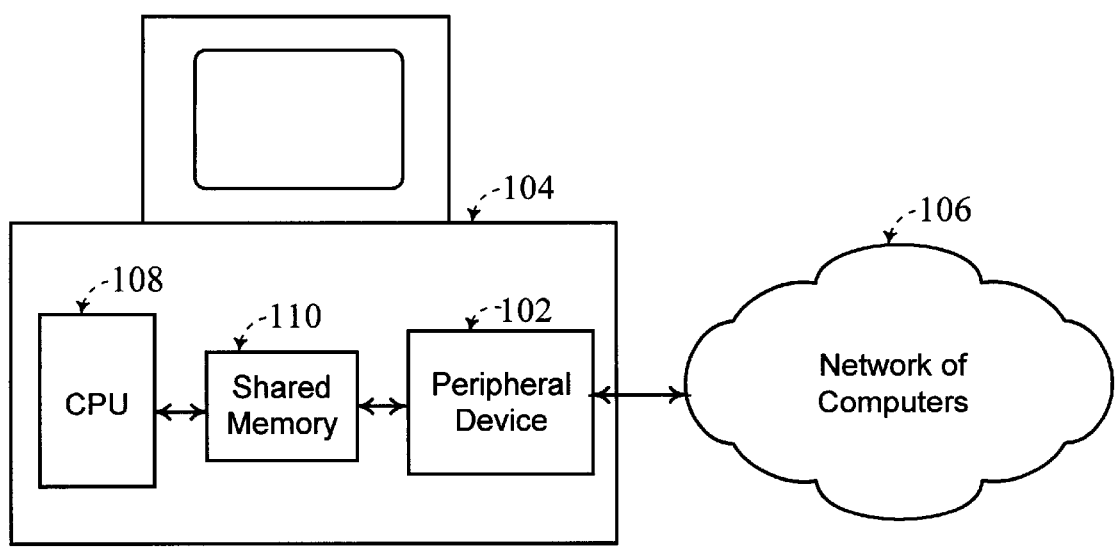
FIG. 1 shows a computer network peripheral device within a host system having a shared memory between the host system and the computer network peripheral device.
Figure 2:
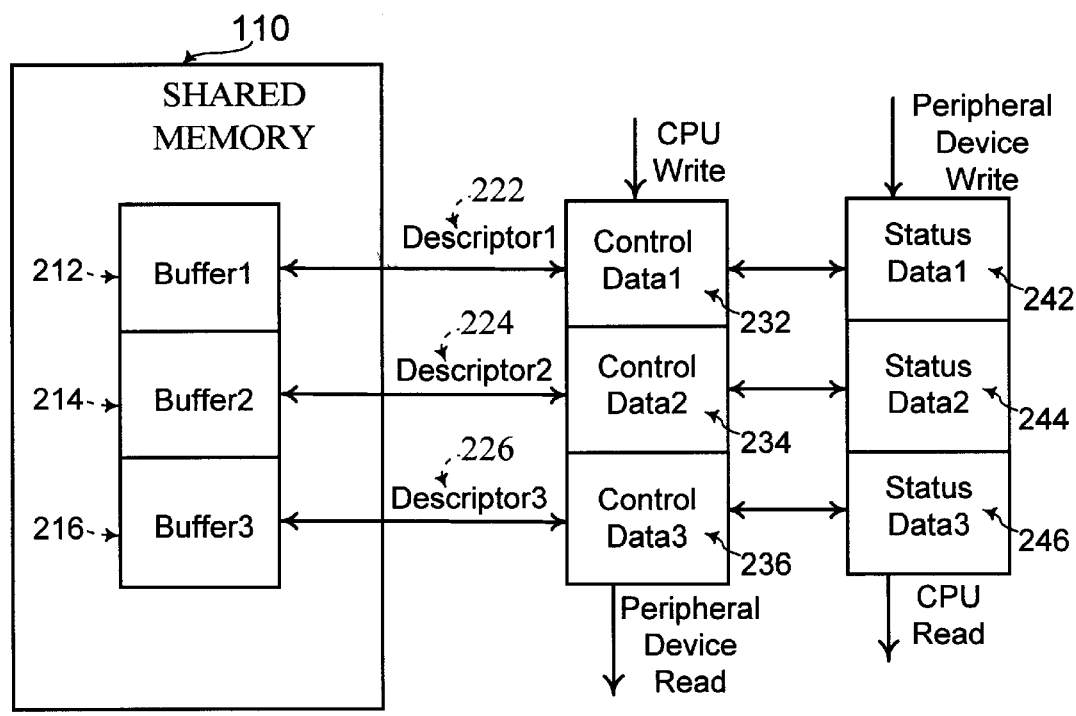
FIG. 2 shows the use of control data and status data for communications between the host system and the computer network peripheral device corresponding to a buffer within the shared memory of FIG. 1.

The present invention is now described for the example of storing a physical address and a logical address corresponding to a buffer in a predetermined location of a status block and a control block corresponding to that buffer. However, any type of data may be stored in the predetermined location of the status block and the control block to minimize data processing overhead, as would be apparent to one of ordinary skill in the art from the description herein.

Referring to FIG. 3, when the CPU 108 accesses a buffer 302 within the shared memory 110, the CPU 108 uses a logical address for specifying the location of that buffer 302 within the shared memory 110. The CPU 108 typically uses logical addresses to operate with a virtual memory space for the shared memory 110 as known to one of ordinary skill in the art of computer system design. The computer peripheral device 102, on the other hand, uses physical addresses for specifying the location of a buffer within the shared memory 110.

Thus, referring to FIG. 3, the CPU 108 includes a logical to physical address translator 304, within an operating system running on the CPU 108, which a driver corresponding to the peripheral device calls for controlling the operation of the computer peripheral device 102. The logical to physical address translator 304 converts a logical address of the buffer 302 into a physical address of the buffer 302. A physical address of the buffer 302 is written into a control block 306 along with other control data from the CPU 108. The computer peripheral device 102 reads the physical address along with other control data corresponding to the buffer 302 from the control block 306 for processing data within that buffer 302.

When the computer peripheral device 102 has processed the data within the buffer 302, the computer peripheral device 102 writes the physical address of the buffer 302 along with other status data into a status block 308. The control block 306 and the status block 308 comprise a respective descriptor corresponding to the buffer 302. The control block 306 and the status block 308 are at separate locations within any type of data storage device 310. The data storage device 310 may be part of the shared memory 110 within the host system 104 or may be a SRAM within the computer peripheral device 102 or may be any other type of data storage device as known to one of ordinary skill in the art of digital systems design.

The present invention is particularly useful when the control block 306 and the status block 308 are at separate independent locations within the data storage device 310. An example design for storing the control block 306 and the status block 308 at separate independent locations is for minimizing cache data processing overhead as described in a copending patent application with title "Minimizing Cache Overhead by Storing Data for Communications between a Peripheral Device and a Host System into Separate Locations in Memory," to Robert Williams having Ser. No. 09/204,978 and filing date of Dec. 3, 1998, and having common assignee herewith. This patent application is incorporated herein by reference.

The CPU 108 reads the physical address of the buffer 302 along with other status data corresponding to the buffer 302 from the status block 308 for processing data within that buffer 302. Because the CPU 108 operates with logical addresses for accessing buffers within the shared memory 110, a physical to logical address table 312 is included within the driver running on the CPU 108 for controlling the operation of the computer peripheral device 102. The physical to logical address table 312 converts the physical address read by the CPU from the status block 308 to a corresponding logical address. Alternatively, the CPU 108 may convert the physical address to a logical address using pointer technology as known to one of ordinary skill in the art of computer system design.

In any case, the translation of the physical address to the corresponding logical address by the CPU 108 requires added data processing overhead for the CPU 108. As known to one of ordinary skill in the art of computer system design, virtual memory systems do not readily translate a logical address from a physical address. Typically, a one-to-one correspondence between a logical address and a physical address does not exist in virtual memory systems. Because a single physical address may be represented by any number of logical addresses in a typical virtual memory system, determination of the original logical address from a physical address is difficult and requires added data processing by the CPU 108.

Referring to FIG. 4, the present invention is a mechanism for exchanging control data and status data for communications between the host system and the computer network peripheral device. The control data and the status data comprise a descriptor corresponding to the buffer 302 within the shared memory 110.

The present invention includes a data storage device 402 having a control block 404 and a status block 406 of the descriptor that corresponds to the buffer 302 in the shared memory 110. The control block 404 stores control data generated by the CPU 108 of the host system 104 to provide control information to the peripheral device 102. The control data includes the physical address of the buffer 302 within the shared memory 110 to specify the location of the buffer 302 within the shared memory 110 to a buffer management unit 408 within the peripheral device. In addition, the control block 404 has a first predetermined location 410 for storing predetermined data such as the logical address of the buffer 302 within the shared memory 110.

After the control data including the physical address of the buffer 302 and the predetermined data (which may be the logical address of the buffer 302 for example) is written into the control block 404 by the CPU 108 (i.e. a data processing unit of the host system 104), the buffer management unit 408 of the peripheral device 102 reads such control data from the control block 404 in order to process data within the buffer 302. For the example of the computer network peripheral device 102 which interfaces the host system 104 to the network of computers 106, the data within the buffer 302 may be for data packets to be transmitted over the network of computers 106.

After processing of the data within the buffer 302 by the peripheral device 102, the buffer management unit 408 of the peripheral device 102 generates and writes status data into the status block 406. The data storage device 402 of the present invention further includes the status block 406 for storing the status data generated by the peripheral device 102 to provide status information to the CPU 108 of the host system 104. The status block 406 further includes a second predetermined location 412 for storing the predetermined data read from the first predetermined location 410 within the control block 404.

After the status data including the predetermined data (which may be the logical address of the buffer 302 for example) is written into the status block 406 by the buffer management unit 408 of the peripheral device 102, the CPU 108 (i.e. a data processing unit of the host system 104) reads such status data from the status block 406 in order to process data within the buffer 302.

The control block 404 is stored at a first location in the data storage device 402 and the status block 406 is stored at a second location in the data storage device 402. The first location and the second location are separate locations on different cache lines as described in a copending patent application with title "Minimizing Cache Overhead by Storing Data for Communications between a Peripheral Device and a Host System into Separate Locations in Memory," to Robert Williams having Ser. No. 09/204,978 and filing date of Dec. 3, 1998, and having common assignee herewith. This patent application is incorporated herein by reference.

If the control data and the status data were stored in the same memory location (in the same memory block for example), the CPU 108 may readily store the predetermined data (such as the logical address) that will be useful for the CPU 108 in a predetermined location within that memory block. The peripheral device 102 does not alter the predetermined data within that predetermined location within that memory block. Then, when the CPU 108 processes status data within that memory block, the CPU 108 may easily access that predetermined data from the predetermined location within that memory block.

In contrast, when the control data and the status data, corresponding to a buffer, are stored in separate locations in memory, the CPU 108 has the added burden of determining the original control block which stores the control data corresponding to the status block of a buffer. The present invention alleviates that added burden to the CPU 108 when the control block and the status block of a buffer are stored in separate locations in memory.

With the present invention of FIG. 4, the CPU 108 of the host system 104 reads the predetermined data from the second predetermined location 412 of the status block 406 for processing data in the buffer 302. The predetermined data 412 has not been used or altered by the peripheral device 102. The peripheral device 102 reads the predetermined data from the first predetermined location 410 of the control block 404, and then passes on such data to the second predetermined location 412 within the status block 406. Thus, the CPU 108 of the host system 104 writes the predetermined data within the first predetermined location 410 of the control block 404 foreseeing the usefulness of such data later when the CPU 108 reads such data from the second predetermined location 412 of the status block 406.

For example, the predetermined data may be the logical address of the buffer 302 within the shared memory 110. The peripheral device 102 operates with physical addresses and does not use the logical address read from the first predetermined location 410 of the control block 404. Rather, the buffer management unit 408 of the peripheral device writes the logical address read from the control block 404 into the second predetermined location 412 of the status block 406. Because the logical address of the buffer 302 is readily available from the status block 406 for that buffer 302, the physical to logical address translator 312 of the prior art is not required. In this manner, the data processing overhead is minimized since a physical to logical address table or other means of converting the physical address to the logical address is no longer used by the CPU 108.

The predetermined data generated and written to the first predetermined location 410 of the control block 404 by the CPU 108 may be any type of data that the CPU 108 foresees to be valuable when the CPU 108 reads such data again later from the second predetermined location 412 of the status block 406. For example, the predetermined data may be a time stamp of when the CPU 108 wrote control data into the control block 404. Then, after the peripheral device 102 processes the data within the buffer 302 and writes status data into the status block 406 including the time stamp data, the CPU 108 may determine the average time for processing of data within the buffer 302 by the peripheral device 102 from the time stamp data.

In addition, the predetermined data may also be a control block number or a control block pointer that facilitates determination of the location of the control block associated with the status block of a buffer. In that case, the CPU 108 may readily locate the control block corresponding to the status block of a buffer even when the control block and the status block are in separate locations in memory.

Alternatively, the buffer management unit 408 of the peripheral device 102 may generate and write the predetermined data to the second location 412 of the status block 406. In that case, the CPU 108 reads that predetermined data from the status block 406 but does not use that predetermined data. The CPU 108 merely writes the predetermined data read from the status block 406 into the first predetermined location 410 of the control block 404. The buffer management unit 408 of the peripheral device 102 reads the predetermined data from the first predetermined location 410 of the control block 404 for processing data in the buffer 302.

Thus, the buffer management unit 408 of the peripheral device generates and writes the predetermined data within the second predetermined location 412 of the status block 404 foreseeing the usefulness of such data later when the buffer management unit 408 reads such data from the first predetermined location 410 of the control block 404. For example, the predetermined data may be a time stamp of when the buffer management unit 408 wrote status data into the status block 406. Then, after the CPU 108 processes the data within the buffer 302 and writes control data into the control block 404 including the time stamp data, the buffer management unit 408 may determine the average time for processing of data within the buffer 302 by the CPU 108 from the time stamp data.

The data storage device 402 of the present invention may be implemented with a SRAM or a register on the peripheral device 102 or as part of the shared memory 110 within the host system 104 or with any other type of data storage device known to one of ordinary skill the art. Furthermore, the buffer management unit 408 may be implemented with a PLA or with any other type of data processing device on the peripheral device 102 as known to one of ordinary skill in the art.

The foregoing is by way of example only and is not intended to be limiting. For example, the present invention may be used for any number of buffers within the shared memory 110. In addition, the present invention may be practiced for any type of computer peripheral device aside from just the example of the computer network peripheral device. Furthermore, the present invention may be used for any type of data to be stored as the predetermined data within the predetermined location of the control block or the status block. The logical address, time stamp, and control block data are by way of example only. The invention is limited only as defined in the following claims and equivalents thereof.

We claim:

1. A method for exchanging control data and status data between a peripheral device and a host system, said control data and said status data comprising a descriptor corresponding to a buffer within a shared memory, the method including the steps of:

A. generating and writing, by said host system, said control data into a control block of said descriptor that corresponds to said buffer in a first location of said shared memory to provide control information to said peripheral device;

B. generating and writing, by said host system, predetermined data into a first predetermined location within said control block;

C. reading, by said peripheral device, said control data and said predetermined data from said control block for processing data in said buffer that corresponds to said descriptor;

D. generating and writing, by said peripheral device, said status data into a status block of said descriptor to provide status information to said host system, said status block being at a second location in said shared memory and wherein said first location of said control block and said second location of said status block are separate independent locations in said shared memory;

E. writing, by said peripheral device, said predetermined data read from said control block into a second predetermined location within said status block; and F. reading, by said host system, said status data and said predetermined data from said status block for processing data in said buffer that corresponds to said descriptor;

wherein said predetermined data read from said second predetermined location within said status block by said host system in said step F is substantially same as said predetermined data priorly written into said first predetermined location within said control block by said host system in said step B.

2. The method of claim 1, wherein said predetermined data includes a logical address of said buffer in said shared memory.

3. The method of claim 1, wherein said predetermined data includes a time stamp of when the host system wrote said control data into said control block.

4. The method of claim 1, wherein said predetermined data includes a control block pointer that facilitates determination of location of said control block of said buffer when said host system reads said predetermined data from said status block.

5. The method of claim 1, wherein said peripheral device is a computer network peripheral device that interfaces said host system to a network of computers, and wherein data within said buffer is for a data packet that is transmitted over the network of computers.

6. A method for exchanging control data and status data between a peripheral device and a host system, said control data and said status data comprising a descriptor corresponding to a buffer within a shared memory, the method including the steps of:

A. generating and writing, by said peripheral device, said status data into a status block of said descriptor that corresponds to said buffer in a first location of said shared memory, to provide status information to said host system;

B. generating and writing, by said peripheral device, predetermined data into a first predetermined location within said status block;

C. reading, by said host system, said status data and said predetermined data from said status block for processing data in said buffer that corresponds to said descriptor;

D. generating and writing, by said host system, said control data into a control block of said descriptor to provide control information to said peripheral device, wherein said control block is at a second location of said shared memory, and wherein said first location of said status block and said second location of said control block are separate independent locations in said shared memory;

E. writing, by said host system, said predetermined data read from said status block into a second predetermined location within said control block; and F. reading, by said peripheral device, said control data and said predetermined data from said control block for processing data in said buffer that corresponds to said descriptor;

wherein said predetermined data read from said second predetermined location within said control block by said peripheral device in said step F is substantially same as said predetermined data priorly written into said first predetermined location within said status block by said peripheral device in said step B.

7. The method of claim 6, wherein said predetermined data includes a time stamp of when the peripheral device wrote said status data into said status block.

8. The method of claim 6, wherein said peripheral device is a computer network peripheral device that interfaces said host system to a network of computers, and wherein data within said buffer is for a data packet that is transmitted over the network of computers.

9. An apparatus for exchanging control data and status data between a peripheral device and a host system, said control data and status data comprising a descriptor corresponding to a buffer within a shared memory, the apparatus comprising:

a data storage device including:

a control block of said descriptor that corresponds to said buffer in said shared memory for storing said control data generated by said host system to provide control information to said peripheral device, and said control block having a first predetermined location for storing predetermined data, and said control block being stored in a first location in said data storage device; and a status block of said descriptor for storing said status data generated by said peripheral device to provide status information to said host system, and said status block having a second predetermined location for storing said predetermined data, and said status block being stored in a second location in said data storage device, and wherein said first location of said control block and said second location of said status block are separate independent locations in said data storage device;

a data processing unit of said host system, coupled to said data storage device for writing said control data into said control block and for generating and writing said predetermined data into said first predetermined location within said control block; and a buffer management unit of said peripheral device, coupled to said data storage device, for writing said status data into said status block, and for reading said predetermined data from said control block to write said predetermined data into said second predetermined location within said status block, wherein said data processing unit reads said predetermined data from said second predetermined location of said status block for processing data in said buffer that corresponds to said descriptor;

and wherein said predetermined data read from said second predetermined location within said status block by said data processing unit is substantially same as said predetermined data priorly written into said first predetermined location within said control block by said data processing unit.

10. The apparatus of claim 9, wherein said predetermined data includes a logical address of said buffer in said shared memory.

11. The apparatus of claim 9, wherein said predetermined data includes a time stamp of when the data processing unit of the host system wrote said control data into said control block.

12. The apparatus of claim 9, wherein said predetermined data includes a control block pointer that facilitates determination of location of said control block of said buffer when said host system reads said predetermined data from said status block.

13. The apparatus of claim 9, wherein said peripheral device is a computer network peripheral device that interfaces said host system to a network of computers, and wherein data within said buffer is for a data packet that is transmitted over the network of computers.

14. An apparatus for exchanging control data and status data between a peripheral device and a host system, said control data and said status data comprising a descriptor corresponding to a buffer within a shared memory, the apparatus comprising:

a data storage device including:

a control block of said descriptor that corresponds to said buffer in said shared memory for storing said control data generated by said host system to provide control information to said peripheral device, and said control block having a first predetermined location for storing predetermined data, and said control block being stored in a first location in said data storage device; and a status block of said descriptor for storing said status data generated by said peripheral device to provide status information to said host system, and said status block having a second predetermined location for storing said predetermined data, and said status block being stored in a second location in said data storage device, and wherein said first location of said control block and said second location of said status block are separate independent locations in said data storage device;

a buffer management unit of said peripheral device, coupled to said data storage device, for writing said status data into said status block, and for generating and writing said predetermined data into said second predetermined location within said status block; and a data processing unit of said host system, coupled to said data storage device, for writing said control data into said control block, and for reading said predetermined data from said status block to write said predetermined data into said first predetermined location within said control block, wherein said buffer management unit of said peripheral device reads said predetermined data from said first predetermined location of said control block for processing data in said buffer that corresponds to said descriptor;

and wherein said predetermined data read from said first predetermined location within said control block by said buffer management unit of said peripheral device is substantially same as said predetermined data priorly written into said second predetermined location within said status block by said buffer management unit of said peripheral device.

15. The apparatus of claim 14, wherein said predetermined data includes a time stamp of when the peripheral device wrote said status data into said status block.

16. The apparatus of claim 14, wherein said peripheral device is a computer network peripheral device that interfaces said host system to a network of computers, and wherein data within said buffer is for a data packet that is transmitted over the network of computers.

* * * * *